Patented Jan. 30, 1934

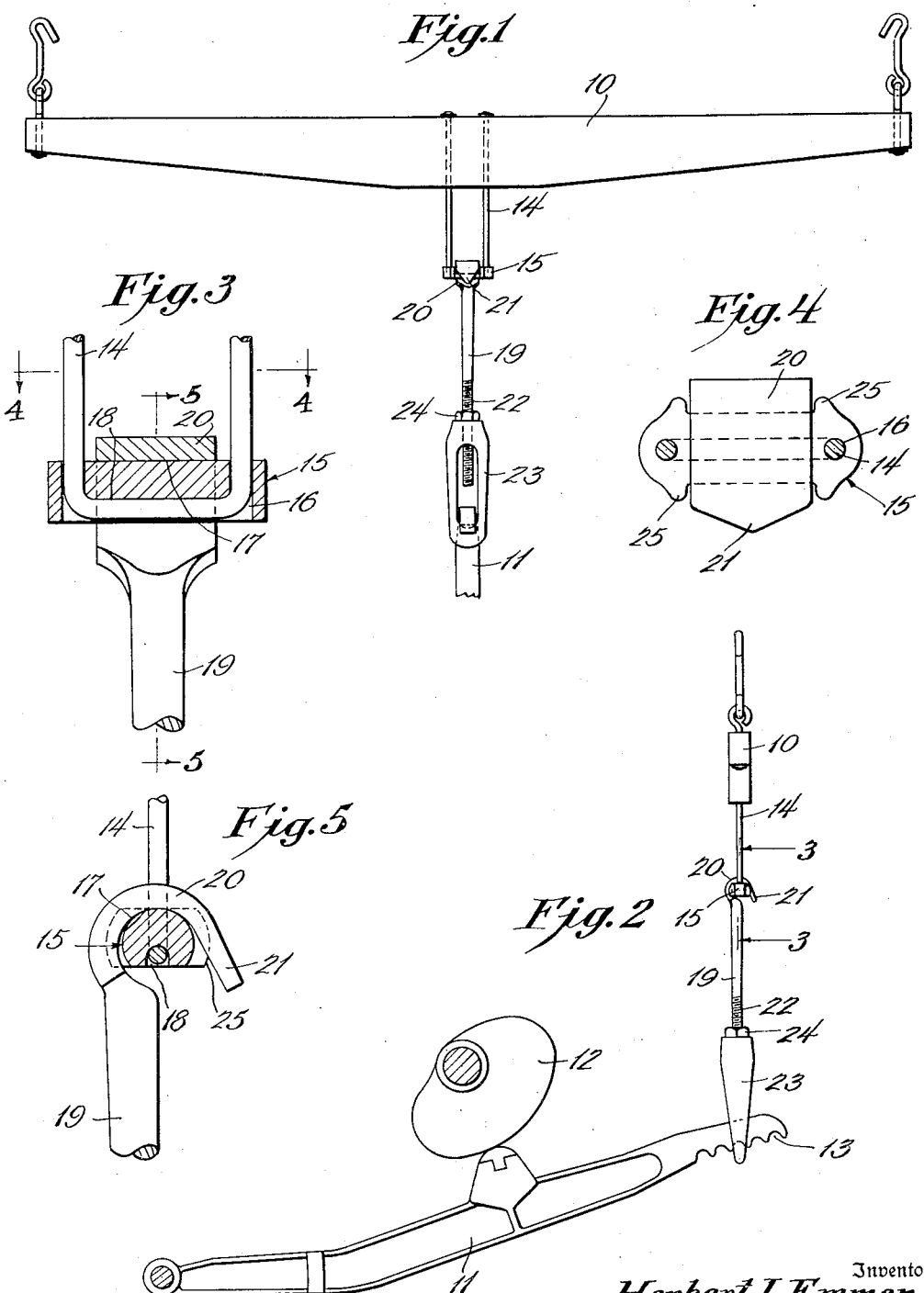

1,944,971

UNITED STATES PATENT OFFICE 1,944,971

LOOM HARNESS OPERATING MECHANISM

Herbert I. Emmons, Methuen, Mass.

Application November 12, 1932
Serial No. 642,425

3 Claims. (Cl. 139—88)

This invention relates to harness operating mechanism for looms and, among other objects, aims to provide an improved jack and treadle connector capable of quick removal from both the jack hanger and the treadle and having provision for easy adjustment.

Other aims and advantages of the invention will be described in the specification, when considered in connection with the accompanying drawing, wherein:

Fig. 1 is a front elevation of a jack showing the preferred form of connector or operating member attached thereto;

Fig. 2 is an elevation at right angles to Fig. 1, parts being shown in section;

Fig. 3 is a sectional view on the line 3—3 of Fig. 2;

Fig. 4 is a sectional view on the line 4—4 of Fig. 3; and

Fig. 5 is a sectional view on the line 5—5 of Fig. 3.

Ordinary jack straps used on looms have very crude means of adjustment and are subject to stretching after they have been used for a short while. Furthermore, such straps often break and entail frequent shutdowns of the loom. This invention provides an improved connector in the form of a connecting rod having hook and clevis connections to the jack and treadle enabling it to be removed instantly and provided with means for making fine adjustments. The main idea is to provide a very durable and simple connecting device which will operate almost indefinitely without attention.

Referring particularly to the drawing, there is shown an ordinary jack 10 which is typical of the jacks used on many different kinds of looms. It is operated by the usual type of treadle 11 which is oscillated by a cam 12 and has a series of notches 13 at its free end. In this example, a U-shaped hanger 14 is connected to the jack and a slidable bearing block 15 having openings 16 is mounted on the legs of the hanger to provide a crescent-shaped, central bearing portion 17 between the legs. The bottom of the bearing block is shown as having a horizontal groove 18 to receive the horizontal part or cross-bar of the U-shaped hangar. This block is slipped on the hanger before it is fastened on the jack.

The improved connector is shown as comprising a connecting rod 19 in the form of a steel bar having a flattened portion bent in the form of a hook 20 having a restricted throat provided by a bill 21 so arranged that the hook may be slipped on the bearing portion 17 of the crescent shaped bearing block by swinging it at an angle to the vertical in which position the restricted throat will straddle the lower flat face of the bearing block and its upper edge.

The lower end of the connecting rod 19 is shown as having screw threads 22 and a clevis 23 is screwed on the rod to the desired adjusted position and locked in place by means of a lock or jamb-nut 24. The clevis is adapted to engage any one of the notches 13 in the lower edge of the treadle to vary the stroke of the harness. When the connector is secured in this manner, the hook cannot be disengaged from its bearing block on the hanger. Moreover, when any adjustment is required, the clevis may be disengaged from the notched end of the treadle and turned on the screw threaded portion of the connecting rod after loosening the jamb-nut 24. Incidentally, the jamb-nut provides a rigid connection between the threaded portions of the connecting rod and the clevis so that the threads will not wear due to any play.

The hook on the upper end of the connecting rod is confined to engage the central portion of the bearing block 15 conveniently by means of integral lugs or beads 25 at the opposite ends of the bearing portion 17, thus preventing the opposite edges of the hook from coming in contact with and wearing the legs of the hanger 14 (Figs. 4 and 5). The bearing block affords a large wearing surface and relieves the cross-bar of the hanger of the constant wear to which it would be subjected if the hook were directly engaged with it. Such bearing blocks can easily be formed of a simple casting which requires very little machining and this type of bearing requires no lubrication.

From the foregoing description, it will be seen that the improved connector is very simple and easy to assemble. Moreover, it can be applied and disconnected without the use of any special tools. It is capable of quick adjustment and is not subject to stretching. It cannot be accidentally disengaged from the hanger while the loom is in operation because of the self-locking connection between the hook and the bearing block.

Obviously, the present invention is not restricted to the particular embodiment thereof herein shown and described.

What is claimed is:

1. In combination with a loom jack and treadle, a U-shaped hanger secured to the jack; a bearing block having a flat portion mounted in the hanger; a connecting rod carrying a hook having a restricted throat or entrance and removably interlocked with the bearing block; and an adjustable connection between the lower end of the rod and the treadle.

2. In combination with a loom jack and treadle, a U-shaped hanger secured to the treadle; a bearing block substantially crescent-shaped in cross section mounted in the hanger; a rod having a flat upper end fashioned into a hook engaging the bearing block and having a restricted entrance to the bight portion to interlock with the bearing block when in its normal working position but permitting removal therefrom by swinging the rod at an angle to the vertical; and adjustable means removably connecting the lower end of the rod to the treadle.

3. In combination with a loom jack and treadle wherein the jack has a hanger and the treadle has a notched end, a connector including a hook presenting a relatively wide bearing surface to engage the hanger and having a restricted throat; a bearing member on the hanger having a relatively narrow portion for insertion in said throat and a wide portion to interlock with said hook when the connector is in its working position; a screw threaded rod connected to the hook; a clevis threaded on the rod; and a jamb nut to hold the clevis adjusted on the rod, said connector adapted to be removed from the treadle and jack by slipping the clevis off the end of the treadle and lifting the hook out of the hanger while the connector is held at an angle to the vertical.

HERBERT I. EMMONS.